United States Patent

Tu et al.

[11] Patent Number: 5,933,516
[45] Date of Patent: Aug. 3, 1999

[54] FINGERPRINT MATCHING BY ESTIMATION OF A MAXIMUM CLIQUE

[75] Inventors: Peter Henry Tu; Richard Ian Hartley, both of Schenectady, N.Y.

[73] Assignee: Lockheed Martin Corp., Orlando, Fla.

[21] Appl. No.: 08/959,177

[22] Filed: Oct. 28, 1997

Related U.S. Application Data

[60] Provisional application No. 60/054,964, Aug. 7, 1997.

[51] Int. Cl.[6] .................................................. G06K 9/00
[52] U.S. Cl. .................................. 382/125; 382/209
[58] Field of Search .............................. 382/124–127, 382/209; 356/71

[56] References Cited

U.S. PATENT DOCUMENTS

| | | | |
|---|---|---|---|
| 4,947,442 | 8/1990 | Tanaka et al. | 382/125 |
| 5,572,597 | 11/1996 | Chang et al. | 382/125 |
| 5,613,014 | 3/1997 | Eshera et al. | 382/124 |
| 5,799,098 | 8/1998 | Ort et al. | 382/125 |

FOREIGN PATENT DOCUMENTS

| | | | |
|---|---|---|---|
| 0098152 | 1/1984 | United Kingdom | G06K 9/00 |

*Primary Examiner*—Leo H. Boudreau
*Assistant Examiner*—Bhavesh Mehta
*Attorney, Agent, or Firm*—W. H. Meise; R. S. Hulse

[57] ABSTRACT

A base pair of minutia is selected in the latent fingerprint under consideration and each tenprint or reference fingerprint. For each selected base pair, those sets of minutia pairs are selected which satisfy apriori constraints including angle, distance and ridge counts, to generate a first set of minutia which support the fingerprint correspondence. A second set of the supporting minutia pairs is generated from the first set, which doesn't contain pairs which are inconsistent with the base pair/bias angle. A third set is established using "dynamic programming" to determine the largest topologically self-consistent subset of the second set. The minutia pairings are counted in the third set, to thereby establish a merit of the base pair. For each of the minutia of the latent fingerprint, a correspondence group is generated, of a predetermined number of minutia of the tenprint which have the greatest merit. The group is searched for a maximal clique in which every latent-tenprint minutia pair is consistent with every other minutia pair in the clique. A cardinality, equal to the number of latent-tenprint minutia pairs in the maximal clique, is stored. The steps are repeated, to generate a set of cardinalities.

5 Claims, 12 Drawing Sheets

FINGERPRINT MATCHING BY ESTIMATION OF A MAXIMUM CLIQUE

This application claims priority of provisional patent application Ser. No. 60/054,964, filed Aug. 7, 1997.

FIELD OF THE INVENTION

This invention relates to fingerprint matching systems, and possibly to systems for the matching of personal characteristics other than fingerprints, and more particularly to matching systems in which a fingerprint or other personal characteristic is to be matched to reference fingerprints or characteristics in a database, by methods including the estimation of a maximum clique.

BACKGROUND OF THE INVENTION

Pattern matching or comparison schemes have many applications, such as identifying machine parts in a manufacturing context, and the reading of addresses in a mail-sorting context. The above-mentioned applications are among the simpler uses of such comparison schemes, because, in the case of machine parts, the number of different parts is finite, and their shapes are, in general, fairly simple: the text reading context has only twenty-six letters and ten numbers to identify, although the number of permutations of text is large.

More complex types of comparisons are those involving differentiation among items which are similar, but not identical, especially when the conditions under which the images are formed is not uniform. When the images are of biological specimens, the variability of the images may be substantial. One such aspect of image matching is that of matching the retinal patterns of subjects for identification. Another use is that of matching of fingerprints for comparison with file fingerprints. The fingerprint to be identified may be termed an "unknown" fingerprint or a "latent" fingerprint.

Fingerprints are very rich in information content. There are two major types of information in a fingerprint. First is the ridge flow information, and second are the specific features or minutiae (minutia) of the fingerprint. As used herein, the term "minutia" is used to denote both the singular and plural. Fingerprints uniquely identify an individual based on their information content. Information is represented in a fingerprint by the minutia and their relative topological relationships. The number of minutia in a fingerprint varies from one finger to another, but, on average, there are about eighty (80) to one hundred and fifty (150) minutia per fingerprint. In the fingerprint context, a large store of fingerprints exists in law enforcement offices around the country. These fingerprints include files of fingerprints of known individuals, made in conjunction with their apprehension or for some other reason such as security clearance investigation or of obtaining immigration papers, often by rolling the inked fingers on cards, and also includes copies of latent fingerprints extracted from crime scenes by various methods.

These reference fingerprints are subject to imperfections such as overinking, which tends to fill in valleys in fingerprints, and underinking, which tends to create false ridge endings, and possibly both overinking and underinking in different regions of the same fingerprint image. Smudging and smears occur at different places in the fingerprint due to unwanted movement of the finger, or uneven pressure placed on the finger, during the rolling process. The stored fingerprints are also subject to deterioration while in storage, which may occur, for instance, due to fading of the older images, or due to stains. Furthermore, the wide variation in the level of experience among fingerprint operators, and the conditions under which the fingerprint is obtained, produces wide variation in quality in the fingerprint images. Similar effects occur due to the variation of the scanning devices in cases of live scanning of fingerprints.

Matching of fingerprints in most existing systems relies for the most part on comparison of cores and deltas as global registration points, which tends to make the comparisons susceptible to errors due to the many sources of distortion and variations listed above, which almost always occur due to the various different inking, storage and preprocessing conditions which may be encountered.

As described at pages 164–191 of the text Advances in Fingerprint Technology, by Henry C. Lee and R. E. Guenssten, published by Elsevier in 1991, efforts have been underway for a long time to automate fingerprint identification, because manual search is no longer feasible due to the large number of reference files. The effort to automate fingerprint identification involves two distinct areas, namely (a) that of fingerprint scanning and minutia identification, and (b) comparison of lists of minutia relating to different fingerprints in order to identify those which match. Large files of reference fingerprints have been scanned, and minutia lists in digital form obtained therefrom, either by wholly automated equipment, or with semi-automated equipment requiring human aid. While not all problems in scanning of fingerprints and detection of minutia have been solved, it appears that the matching problem is the more pressing at this time.

The matching or search subsystem constitutes the most critical component of any Automated Fingerprint Identification System (AFIS). Its performance establishes the overall system matching reliability (the probability of declaring the correct mate, if one exists in the database), match selectivity (the average number of false candidates declared in each search attempt), and throughput, which is particularly important in large database systems. The unique identification of fingerprints is usually performed using the set of minutia contained in each fingerprint.

U.S. Pat. No. 5,613,014, issued Mar. 18, 1997 in the name of Eshera et al. describes a fingerprint matching technique using a graphical attribute relational graph (ARG) approach. This ARG approach is fast, and particularly advantageous for those cases in which the minutia of the latent or unknown fingerprint are numerous and well defined, but may be hindered in finding the correct match by errors in locating minutia near the center of each star when the latent image is poor and minutia are missing.

In those cases in which the latent print quality or other considerations result in a failure to perfectly match by the ARG method, it may be desirable to perform a match using a larger number of constraints than in the ARG technique.

SUMMARY OF THE INVENTION

A method for matching an unknown fingerprint, or a fingerprint to be identified, with a database of known fingerprints, which method comprises the step of selecting a tenprint or reference fingerprint for comparison with a latent fingerprint under consideration. A base pair of minutia is selected in each of the latent and tenprint fingerprints. For the selected base pair, those sets of minutia pairs are selected which satisfy a priori constraints including angle distance and ridge counts, to thereby generate a first set of supporting minutia pairs, which support the supposition that the latent fingerprint corresponds to the tenprint fingerprint. A bias angle is determined between the minutia of the base pair based on the angles of the minutia of the sets of minutia pairs relative to the base pair. A second set of the supporting minutia pairs is generated by reducing the first set using the bias angle. The second set does not contain those pairs of the first set of supporting minutia pairs which are inconsistent with the base pair considered with the bias angle. A third set is established by determining the largest subset of the second set which is topologically self-consistent. The number of minutia pairings are counted in the third subset, to thereby establish a merit of the base pair. A new base pair, not already selected, is selected, and for the new base pair, the steps of generating a first set, determining a bias angle, generating a second set, establishing a third set, and counting the number of minutia pairings are repeated, to thereby establish a merit for the new base pair. A table of merits is formed for all possible base pairs, by repeating the step of selecting a new base pair for all possible base pair combinations of the latent and tenprint fingerprints. For each of the minutia of the latent fingerprint, a correspondence group is generated, of a predetermined number of minutia of the tenprint which have the greatest merit.

The correspondence group is searched for a maximal clique in which every latent-tenprint minutia pair is consistent with every other latent-tenprint minutia pair in the clique. The cardinality of the maximal clique is temporarily stored. The cardinality is equal to the number of latent-tenprint minutia pairs in the maximal clique. The steps of selecting a tenprint fingerprint for comparison, selecting a base pair of minutia, selecting those sets of minutia pairs which satisfy a priori constraints, determining a bias angle, generating a second set, establishing a third set; counting the number of minutia pairings in the third set, selecting a new base pair, forming a table of merits; generating a correspondence group, searching the correspondence group for a large maximal clique, and temporarily storing the cardinality, are repeated for all relevant tenprints in the database, to thereby generate a set of cardinalities. From the set of cardinalities, at least that one member of the set is selected which has the greatest value, as representing that one of the tenprints most closely matching the latent fingerprint.

In a particular method according to the invention, the step of determining a bias angle includes the step of maximizing a Bayesian probability measure. The step of maximizing a Baysian probability measure may include the step of rejecting outlier data, counting the number of the sets of a priori candidate minutia for each selected set of candidate and base minutia, and determining the number of candidate minutia pairs which are consistent with the base pair of minutia based on the a priori data.

In a method according to the invention, the step of determining the largest subset of the second set which is topologically self-consistent, to thereby establish a third set, is performed by dynamic programming.

DESCRIPTION OF THE INVENTION

In general, the fingerprint matching technique in accordance with the invention is more constrained than the ARG method, in that the matching of the minutia of the unknown or latent fingerprint being compared with a plurality of known or background fingerprints of a database compares all sets of minutia pairs with all sets of base pairs and enforces consistency among those pairs, rather than matching and forcing consistency only among those minutia adjacent to the center of a star, and then between joined stars. Thus, matching is done across the entire print simultaneously, rather than being built up by joining stars.

A system according to the invention starts with a skeleton image of the latent and tenprint fingerprints, and a list of minutia, which includes their locations and directions or orientations. It should be noted that the term "tenprint" appears to have become a generic term, which can include a print of a single finger. The skeleton image is used to determine the ridge count between minutia. Performing a ridge count between minutia is well known. After the ridge count is performed, the skeleton fingerprint is no longer needed. Thus, the information required includes the minutia and the ridge counts.

Figure 1:
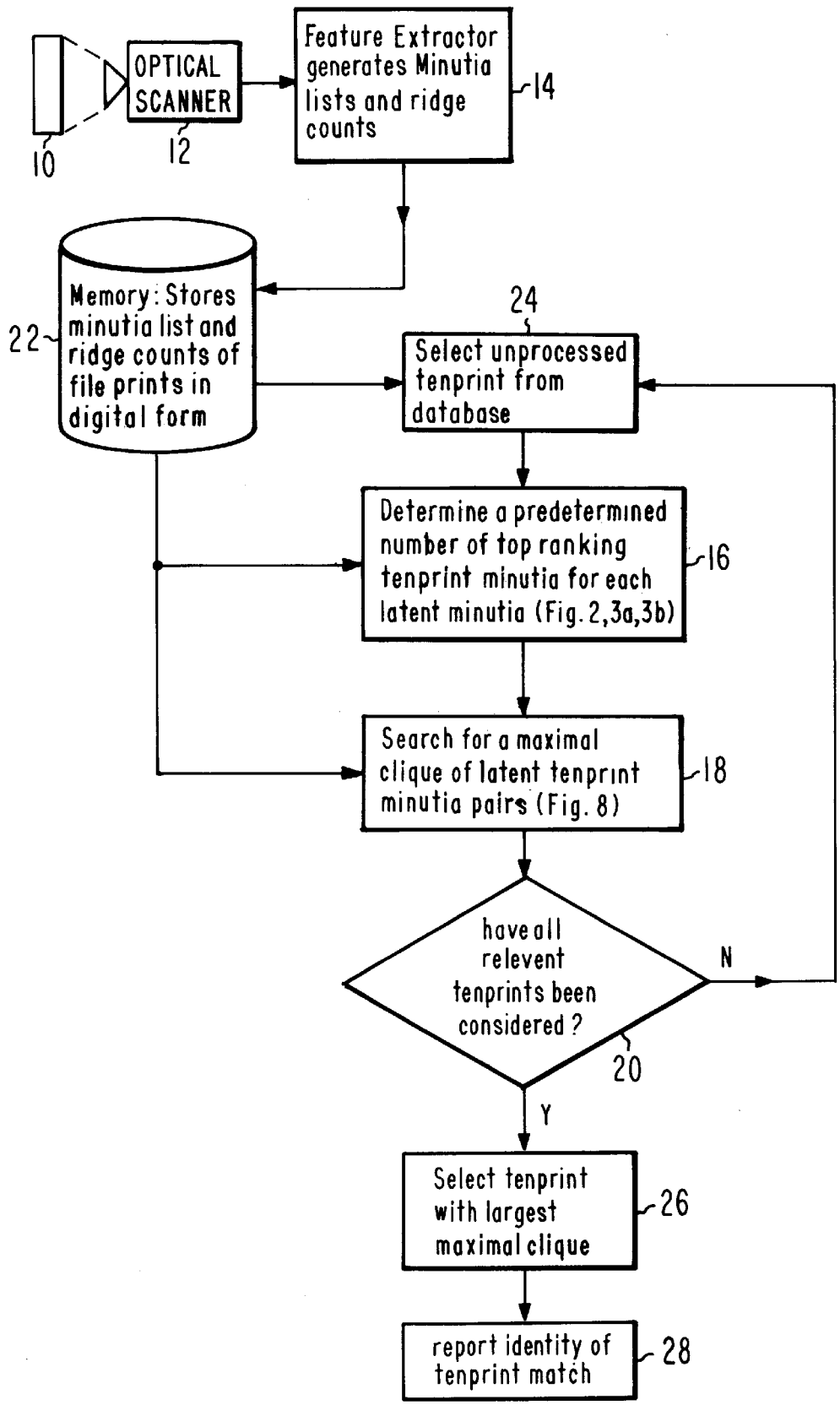
FIG. 1 is a simplified block and schematic diagram listing the principal steps, including steps in accordance with the invention, of a method for fingerprint matching.

FIG. 1 is a simplified illustration of a system according to the invention. In FIG. 1, a fingerprint image 10 is scanned by an optical scanner 12, and the resulting data is applied to a feature extraction device or processor 14 for extracting and listing minutia, and for performing ridge counting, preparatory to processing in accordance with the invention. The minutia lists, ridge counts, identification, and like information relating to fingerprint image 10 is stored in memory, illustrated as a memory 22, which may also contain a database of reference fingerprints, sometimes known as tenprints.

In FIG. 1, block 24 starts the comparison process by selecting an appropriate one of the tenprints or reference fingerprints stored in database 22, for comparison with the latent fingerprint being considered. The process proceeds to a further processing stage illustrated as a block 16. Block 16 represents determination of a predetermined number of top-ranking tenprint minutia for each latent minutia. For example, for each latent-tenprint fingerprint minutia pair, all other pairs of latent-tenprint minutia for a single tenprint) are compared based on a priori information inherent in the stored minutia information, including minutia location and direction, and ridge counts. Of the minutia pairs which are examined, ten (for example) of those pairs are selected for each latent minutia.

When the processing related to block 16 is completed, the comparison process proceeds to the next step, which is represented by block 18. Block 18 represents a search among those top-ranked minutia selected in the step of block 16 for a maximal clique of self-consistent latent-tenprint minutia pairs, such that each pair of latent-tenprint minutia is consistent, with respect to orientation, ridge count and distance or mutual separation, with all other latent-tenprint minutia pairs in the clique. While the described technique for searching produces a maximal clique, and is likely to produce a large maximal clique, it may not produce a global maximum clique. An exhaustive search could produce a global peak, and would be more advantageous in terms of accuracy, but appears to be an intractable problem requiring an unreasonable amount of processing. The quality or merit of the match is measured by the size or number of latent-tenprint minutia pairs in the maximal clique.

This information is stored for later use. The processing represented by block 18 completes the processing of the latent fingerprint with respect to this particular tenprint.

Once a maximal clique is determined in block 18, the search proceeds to the next step, represented by a decision block 20, which compares an index of tenprints with a register representing all relevant tenprints to see if all comparisons have been made. If not, the process of FIG. 1 returns by the NO output of decision block 20 to block 24, in which a new tenprint, having the next higher index number, is retrieved from memory, for comparison by the process described in conjunction with blocks 16 and 18.

The procedure represented by blocks 16 and 18 is repeated for all the relevant tenprints in the database. In this context, a relevant tenprint may be one which is selected from among those of all felons on file, all index fingers, or in any other way which tends to reduce the number of tenprints to be matched. It may be necessary, in some cases, to examine all tenprints in the database, in which case the relevant tenprints includes all tenprints.

The process described in relation to blocks 16, 18, 20, and 24 is repeated until all relevant tenprints have been compared. When all tenprints have been compared with the latent print, decision block 20 directs the process to a block 26, which represents selection of that one of the tenprints which is the most likely match to the latent print, based on the size of its maximal clique. Block 28 represents the reporting of the result.

Figure 2:
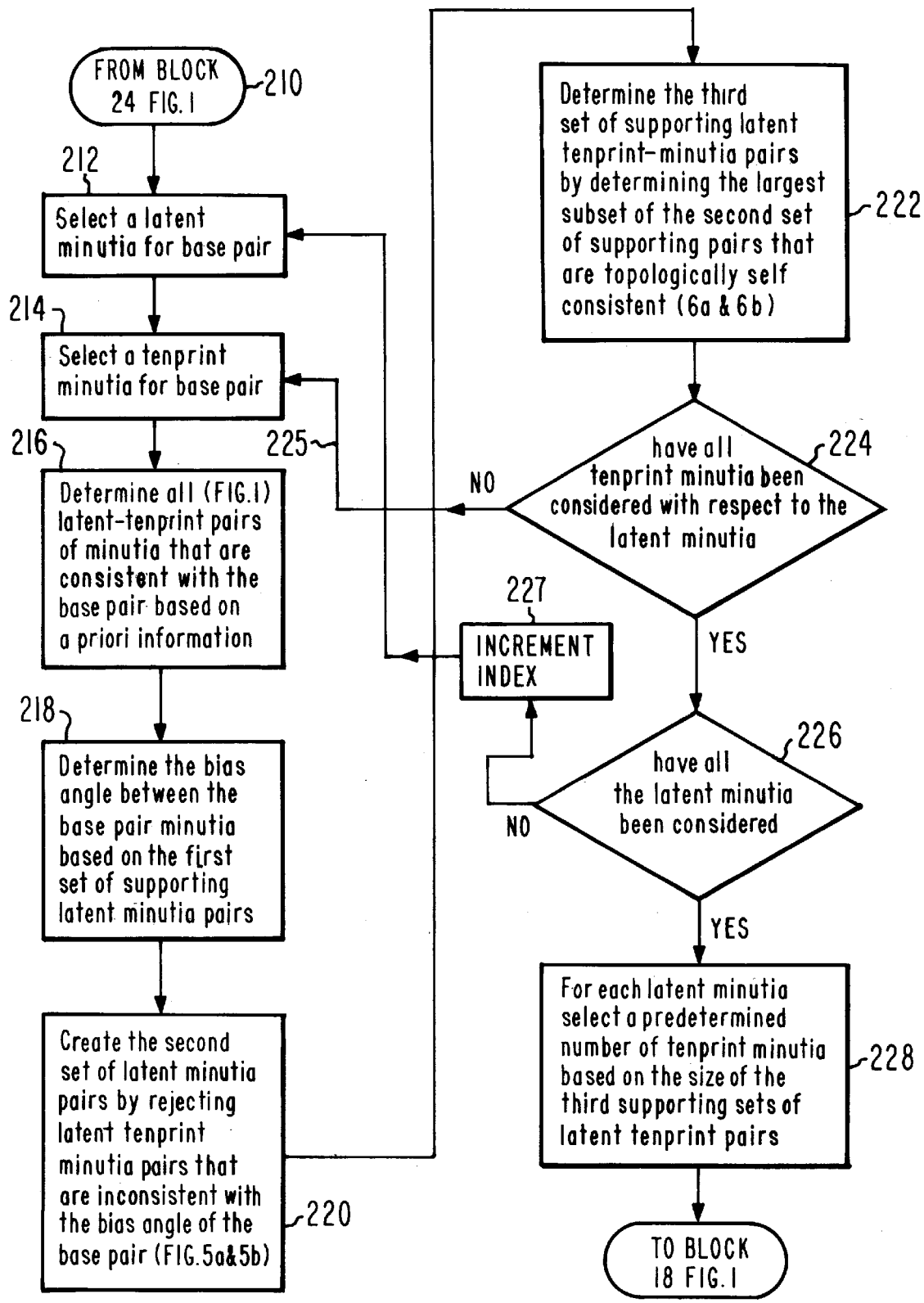
FIG. 2 is a simplified general flow chart illustrating steps for performing a portion of the processing of the method of FIG. 1.

FIG. 2 is a more detailed flow chart, to aid in understanding the processing in block 18 of FIG. 1. In FIG. 2, the logic flows from a block 210, representing earlier stages of processing, to a further logic block 212, which represents, for a given latent fingerprint, selection of the first minutia of the latent fingerprint as a candidate for a member of a base pair of latent/tenprint base minutia. This assumes that the minutia are already indexed or numbered, and block 212 also includes the step of indexing or numbering of the minutia, if they are not already numbered. From logic block 212, the logic flows to a further block 214, which represents selection of a first tenprint minutia as a candidate for a base pair from the relevant tenprint, if they are already numbered or indexed, and if they are not so indexed, also includes the step of indexing. The logic flows from block 214 to a further logic block 216, which represents collection of the first supporting of latent-tenprint minutia pairs which are consistent with the selected base latent-tenprint minutia pair based on a priori information relating to minutia location, direction, and ridge count between minutia. The processing of block 216 is described in more detail in the flow chart of FIGS. 3a and 3b, in conjunction with FIGS. 4a and 4b. These sets are reduced in number by bias angle considerations in logic blocks 218 and 220, which are explained in more detail in the flow chart of FIGS. 5a and 5b. More particularly, block 218 represents determination of a bias angle between the orientations of the latent and tenprint minutia of the base pair, to produce a second set of supporting latent-tenprint pairs. Block 220 reduces the second set of supporting latent-tenprint minutia pairs by deleting or rejecting those latent-tenprint minutia pairs which are inconsistent with the bias angle of the base pair, and this reduced second set of supporting latent-tenprint minutia pairs constitutes a second set of supporting latent-tenprint minutia pairs.

From logic block 220 of FIG. 2, the logic flow to a further block 222, which represents determination of the third set of supporting latent-tenprint minutia pairs, which is the largest subset of the second set which is topologically self-consistent. Details of the processing performed in block 222 are described in conjunction with the flow chart of FIGS. 6a and 6b. The number of minutia which are included in the third set is a measure of the quality of the match between the current latent and tenprint base pair. This number is temporarily stored in memory, and the logic then proceeds to a further decision block 224, which compares the index of the current one of the minutia of the current tenprint being processed with the index representing the last one of the minutia of the relevant tenprint, to determine if the current minutia of the current latent fingerprint has been compared with all of the minutia of the current tenprint. If not, the logic flows by way of the NO output of decision block 224 by way of a path 225 back to logic block 214, where another tenprint minutia is selected as a candidate to be a member of the base pair, and the logic again proceeds about the loop including blocks 216, 218, 220, 222, and back to decision block 224. Eventually, all of the minutia of the current tenprint will have been evaluated as a member of the base pair with the current one of the minutia of the latent print being evaluated, and the logic will then leave decision block 224 by way of the YES output. From the YES output of decision block 224, the logic flows to a further decision block 226, which compares the index of the latent minutia with a table listing all the minutia of the current latent fingerprint, to determine if all of the minutia of the current latent fingerprint have been evaluated as a member of the base pair. If all of the minutia of the latent fingerprint have not been evaluated, the index is incremented in a block 227, and the logic flows back to logic block 212 for selection of the next minutia for evaluation. The logic flows about the logic path including blocks 214, 216, 218, 220, 222, 224, 226, and 227 as many times as may be required in order to evaluate all of the minutia of the latent fingerprint as a member of the base pair. Eventually, all of the minutia of the latent fingerprint will have been used as a member of the base pair, and the logic will exit decision block 226 by the YES output, and proceed to a block 228. Logic block 228 represents selection of a predetermined number of tenprint minutia as being potential candidates for a match between the given latent minutia and the tenprint minutia, based on the size of the third supporting subset determined in logic block 222. At this point in the processing of the particular latent fingerprint, for each of the minutia of the latent fingerprint, a plurality of tenprint minutia have been selected which may correspond, or be a match therewith. The quality of the match is indicated by the number of latent-tenprint pairs in the third supporting set of pairs. From block 228 of FIG. 2, the logic flows to block 18 of FIG. 1.

Figure 3A:
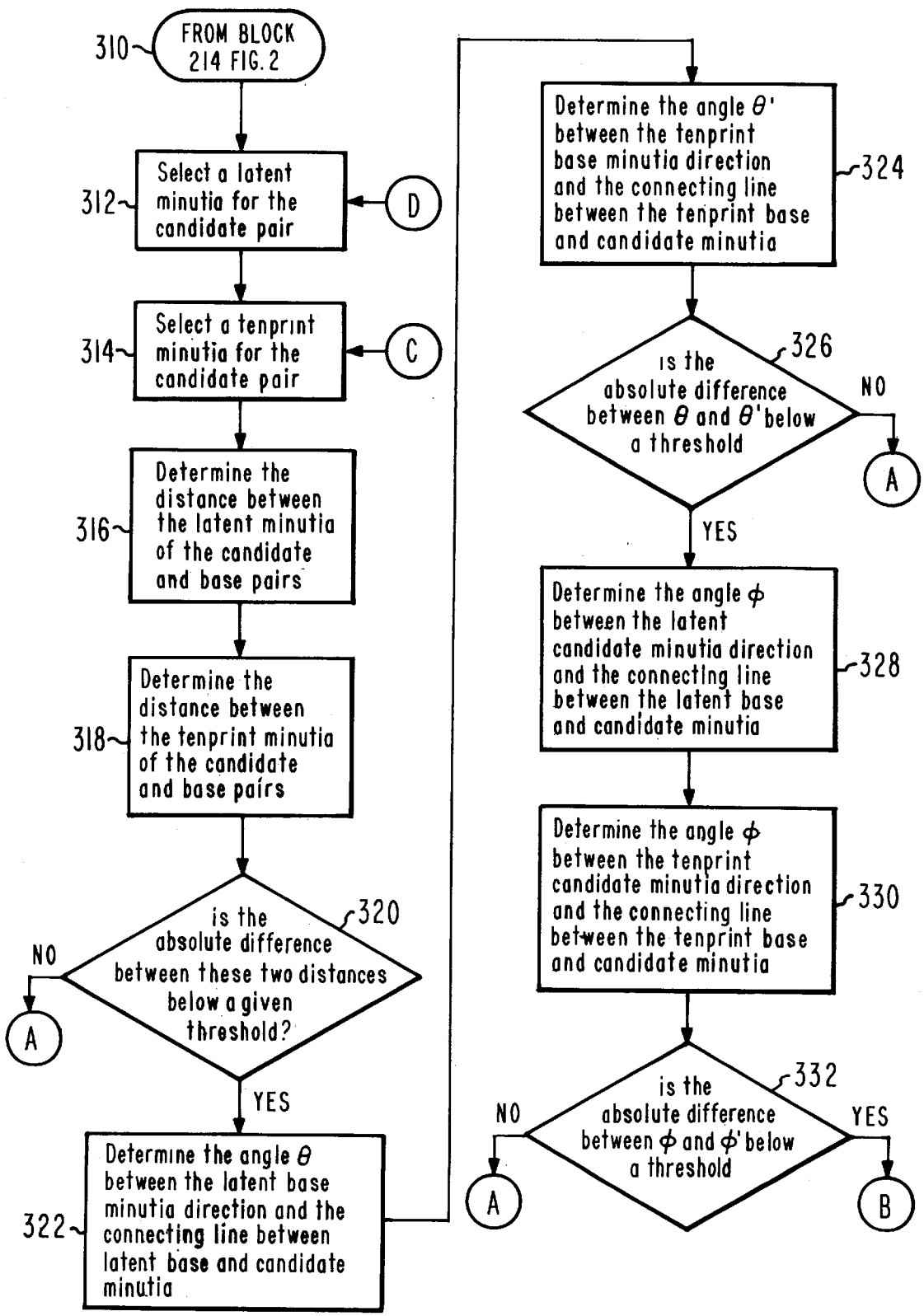
FIGS. 3a and 3b taken together are a flow chart illustrating a portion of the processing of FIG. 2.
Figure 4A:
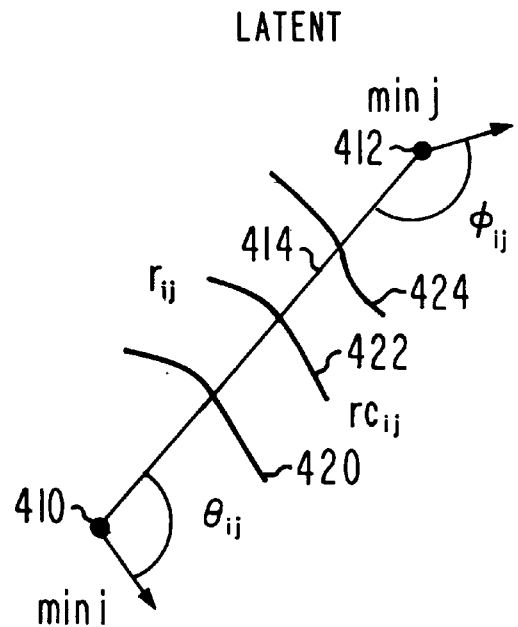
FIGS. 4a and 4b illustrate minutia of the latent fingerprint and the tenprint under consideration, showing the nature of the information being evaluated.
Figure 4B:
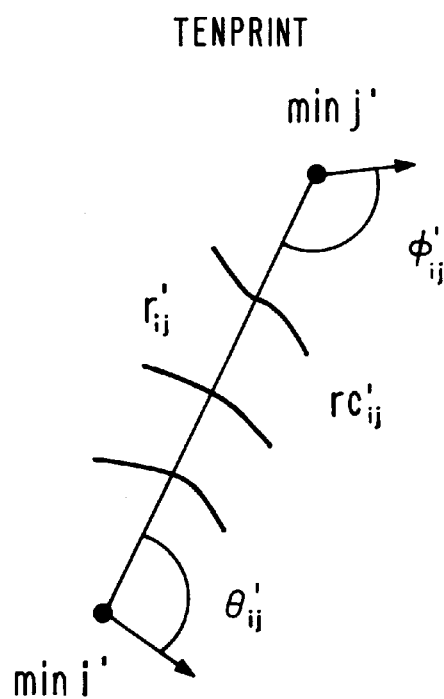

FIG. 3a is a simplified flow chart representing the logic flow of block 216 of FIG. 2. The flow chart of FIG. 3a represents, for a given base pair of minutia, which is to say for a given minutia of the latent fingerprint and a corresponding minutia of the current tenprint, evaluation of all other minutia pairs to determine which pairs are consistent with that base pair with respect to a priori information. The a priori information includes (a) Cartesian distance between minutia, (b) angle between the direction of the minutia and a line connecting the minutia, and (c) the ridge counts between the minutia. In FIG. 3a, the logic starts at a start block 310, and flows to a further block 312, which represents selection of a latent minutia from among the remaining minutia of the latent fingerprint for evaluation. From block 312, the logic flows to a block 314, which represents selection, for comparison with the current latent fingerprint minutia, of a tenprint minutia other than the minutia which is a member of the base pair. Block 316 represents determination of the Cartesian or Euclidean distance between the latent base and candidate minutia, and block 318 represents the corresponding distance between the tenprint base and candidate minutia. FIG. 4a represents the latent base minutia 410 and latent candidate minutia 412, with the directions of the base and candidate minutia indicated by arrows. The base minutia 410 is designated mini, and the candidate minutia 412 is designated as min$_j$. A connecting line or vector 414 joins the base and candidate minutia 410 and 412. An angle $\theta_{ij}$ lies between the direction of the base minutia 410 and connecting line 414. An angle $\Phi_{ij}$ lies between the direction of the candidate minutia 412 and connecting line 414. The peaks of three ridges, illustrated in skeletonized form as lines 420, 422, and 424, cross connecting line 414, and the distance between base minutia 410 and candidate minutia 412 is therefore three, measured in ridges. FIG. 4b represents the tenprint base minutia 450 and candidate minutia 452, with the directions of the base and candidate minutia indicated by arrows. The base minutia 450 is designated min$_i$', and the candidate minutia 452 is designated as min$_j$'. A connecting line or vector 454 joins the base and candidate minutia 450 and 452. An angle $\theta_{ij}$' lies between the direction of the base minutia 450 and connecting line 454. An angle $\Phi_{ij}$' lies between the direction of the candidate minutia 452 and connecting line 454. The peaks of three ridges, illustrated in skeletonized form as lines 470, 472, and 474, cross connecting line 454, and the distance between base minutia 450 and candidate minutia 452 is three, measured in ridges. The lengths of connecting lines 414 and 454 represent the distances between the candidate and base minutia of the latent fingerprint and tenprint, respectively.

From block 318 of FIG. 3a, the logic flows to a decision block 320, which takes the absolute value of the difference between the lengths of the latent and tenprint connecting lines 414 and 454 to thereby obtain a magnitude of the difference, and compares the magnitude of the difference with a threshold value. If the magnitude of the difference is large or above the threshold, the two minutia pairs are not well matched, and the logic flows from decision block 320 by the NO output to a logic node A, indicating that the candidate latent minutia is not useful. If the magnitude of the difference in length is smaller than the threshold, the current latent minutia is a close match to the current tenprint minutia, at least as to the length criterion. In this case, the logic flows from the YES output of decision block 320 of FIG. 3a to a further block 322.

Block 322 of FIG. 3a represents examination of the angle $\theta$ between the latent base minutia direction and the connecting line 414, illustrated in FIG. 4a. From block 322 the logic flows to a further block 324, which determines the like angle $\theta$' for the tenprint of FIG. 4b. Decision block 326 compares the difference between the angles $\theta$ and $\theta$' with a threshold value. If the angular difference is large, the connecting line 414 connecting latent minutia candidate 412 to the base minutia 410 is rejected, which means that latent candidate minutia 412 is itself rejected. In that event, the logic exits decision block 326 by the NO output, and proceeds to logic node A. If the angular difference between angles $\theta$ and $\theta$' is small, the connecting line 414 to the candidate latent minutia 412 is not rejected, in which case the logic exits from decision block 326 by the YES output. From the YES output of decision block 326, the logic flows in sequence to further blocks 328 and 330. Block 328 represents determination of the angle $\Phi$ between the latent candidate minutia 412 and the connecting line 414, and block 330 represents the determination of the angle $\Phi$' between the direction of tenprint minutia 452 and connecting line 454. Decision block 332 compares the difference between angle $\Phi$ and angle $\Phi$' with a threshold value. If the angular difference is larger than the threshold, the logic leaves decision block 332 by the NO output, and flows to logic node A, representing rejection of the candidate pair. From node A, the logic flows to decision block 342 of FIG. 3b, and another minutia of the tenprint is considered as a candidate for pairing with minutia 412 of FIG. 4a. If the difference between angles $\Phi$ and $\Phi$' is smaller than the threshold, the minutia pair is not rejected, which is represented in FIG. 3a by a flow of the logic from the YES output of decision block 332 to logic node B.

Figure 3B:
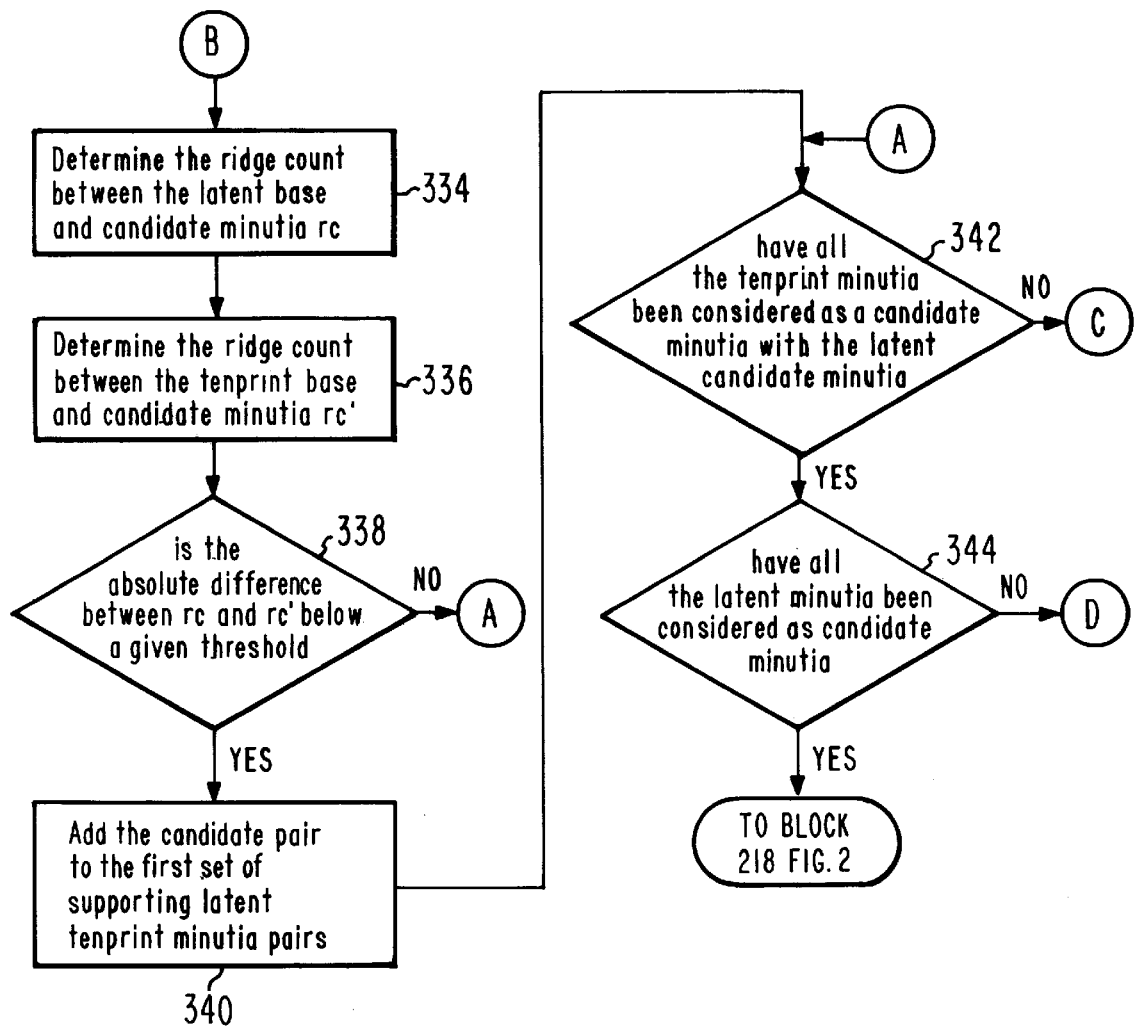

From logic node B of FIG. 3a, the logic flows to logic node B of FIG. 3b and to a block 334, which represents determining the number of ridges or the ridge count rc between the latent base and candidate minutia. In FIG. 4a, three ridges are illustrated, namely ridges 420, 422, and 424, so the ridge count is three in the illustrated example. From block 334 of FIG. 3b, the logic flows to a block 336, which represents determination of the ridge count rc' between the candidate and base minutia for the tenprint. In the illustration of FIG. 4b, the ridge count for the tenprint is also three. Decision block 338 of FIG. 3b takes the absolute magnitude of the difference between latent and tenprint ridge counts rc and rc', and compares the absolute value with a threshold value. If the difference is large, or greater than the threshold, the logic exits decision block 338 by the NO output path, and goes to logic node A. If the difference is smaller than the threshold value, the logic exits decision block 338 by the YES path, and arrives at a further block 340. Block 340 represents addition of the candidate minutia pair to the first set of latent-tenprint minutia pairs supporting the correspondence of this latent-tenprint base pair. From block 340, the logic flows, together with the logic flows from nodes A, to a further decision block 342. Decision block 343 compares the index of the current tenprint minutia with the index value of the last or maximum minutia in the current tenprint, to verify that all the minutia of this tenprint have been evaluated. If they have not all been evaluated, the logic leaves decision block 342 by the NO path, and returns by way of a logic node C to block 314 of FIG. 3a. The logic selects, in that case, another tenprint minutia for the candidate pair, and the logic then traverses blocks 316, 318, 320, 322, 324, 326, 328, 330, 332, 334, 336, 338, 340, and 342 repeatedly, adding the candidate pairs to the first set of supporting latent-tenprint minutia pairs at each pass, if appropriate. Eventually, all of the minutia in the tenprint currently being considered will have been evaluated, and the logic will then leave decision block 342 by the YES path, and flow to a further decision block 344.

Decision block 344 of FIG. 3b compares an index of the current latent minutia being evaluated with an index of the last or maximum latent minutia, to determine if all of the minutia of the latent fingerprint have been evaluated. If they have not all been evaluated, the logic leaves decision block 344 by the NO path, and flows by way of a logic node D back to logic block 312 of FIG. 3a. In logic node 312, another minutia of the latent fingerprint, which has not yet been evaluated, is selected for evaluation. The logic leaves block 312, and traverses logic blocks 314, 316, 318, 320, 322, 324, 326, 328, 330, 332, 334, 336, 338, 340, 342, and 344 in a loop fashion, adding candidate pairs to the first set of latent-tenprint supporting minutia pairs at each pass, if appropriate. Eventually, the last minutia of latent fingerprint will have been reached for the tenprint currently being evaluated. When this condition occurs, the logic leaves decision block 344 by the YES path, rather than looping back by way of the NO path. From the YES output of logic block 344, the logic flows on to block 18 of FIG. 1, in which a search is performed for a maximal clique of the latent-tenprint minutia pairs.

Figure 5A:
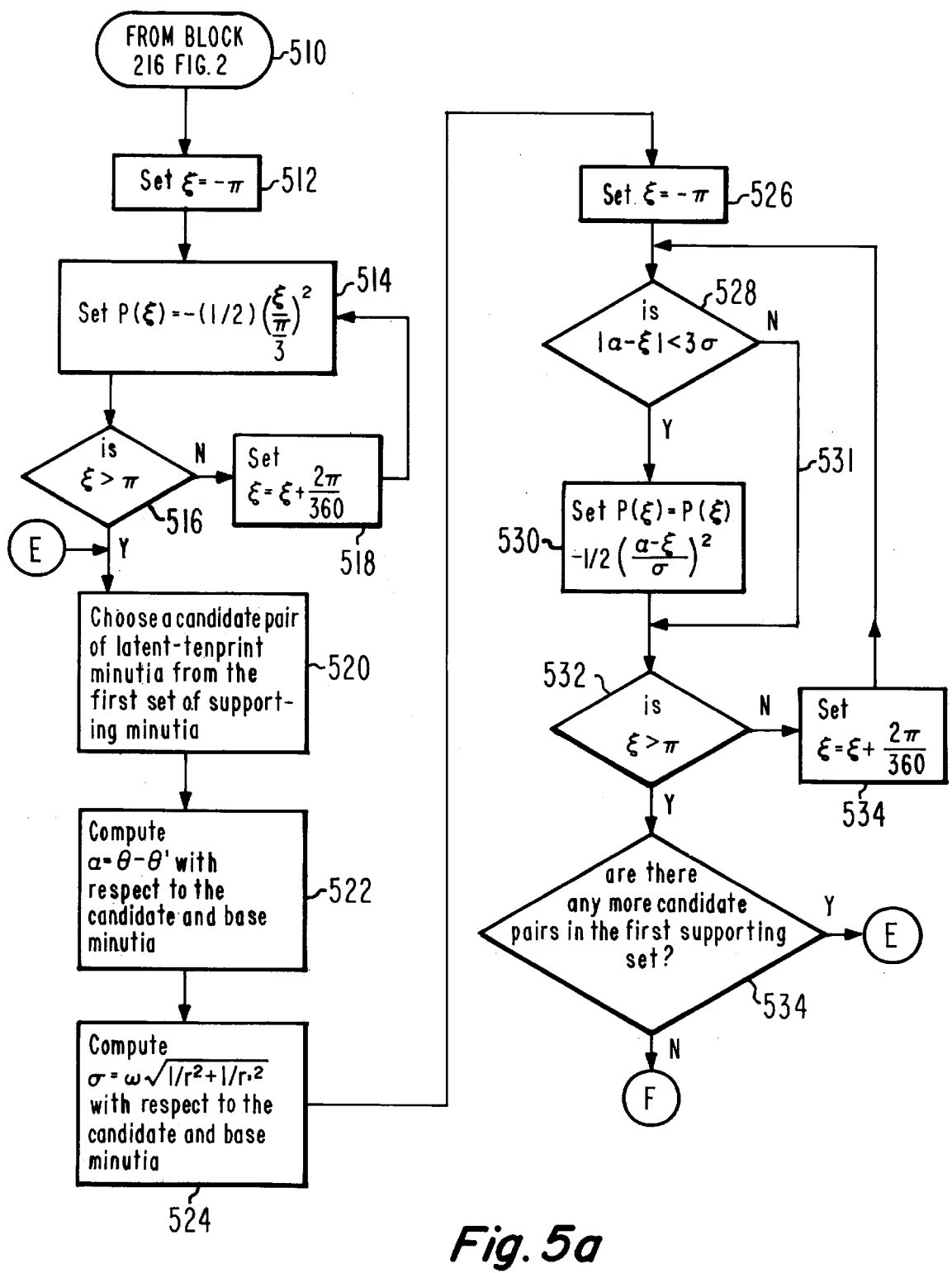
FIGS. 5a and 5b taken together are a flow chart illustrating another portion of the processing of FIG. 2.
Figure 5B:
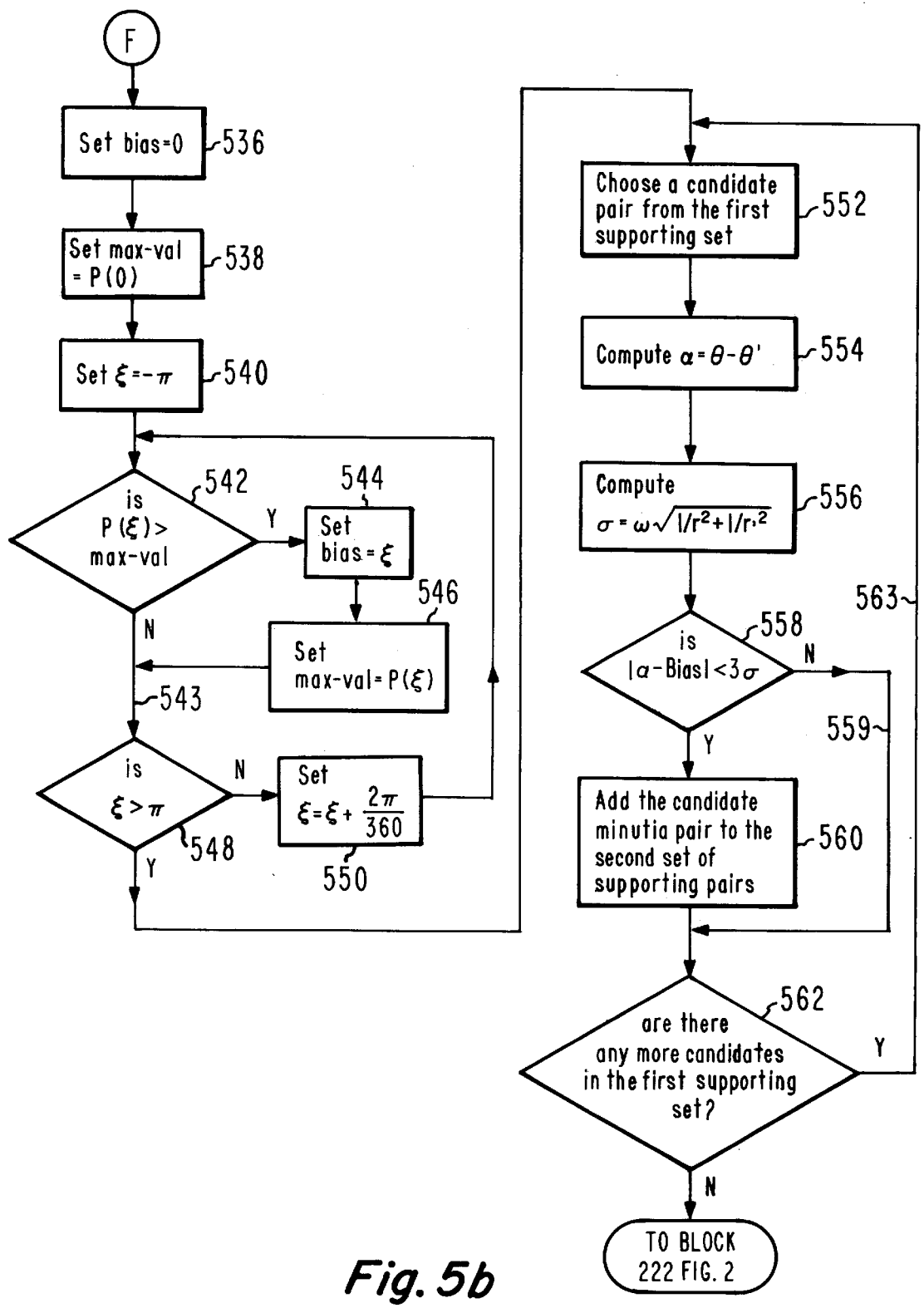

FIGS. 5a and 5b together illustrate the processing performed in blocks 218 and 220 of FIG. 2. The logic of FIG. 5a begins at a logic receiving block 510, and proceeds to a block 512, which represents setting an index $\zeta$ of a possible or candidate bias angle to a value of 180° or $-\pi$. From logic block 512, the logic flows to a block 514, which represents the setting of P($\zeta$), the bias accumulator array, to an initial value derived from the initial angular bias, $$P(\xi) = -(1/2)\left(\frac{\xi}{\frac{\pi}{3}}\right)^2 \qquad 1$$

From logic block 514, the logic flows to a decision block 516, which, when $\zeta$ is greater than $\pi$, loops the logic back to block 514 by way of a further logic block 518. Block 518 adds a small angle, in this case ($2\pi/360$) or 1°, to the current value of $\zeta$, so that the output of block 518 is $\zeta+1°$. If $\zeta$ is not greater than $\pi$, decision block 516 directs the logic onward to a block 520.

Blocks 520, 522, 524, 526, 528, and 530 of FIG. 5a together represent the modification of the accumulator array P($\zeta$), which was initially set using a priori information, with information from the measurements between the members of the first set of supporting minutia pairs and the base pair. Blocks 520, 522, and 524 represent calculation of statistics about the relationship between the candidate minutia pair and the base pair. Block 520 represents selection of a candidate latent-tenprint minutia pair from the first set of supporting minutia pairs. The logic flows from block 520 to block 522, which represents determination of the angular difference $\alpha$ between the directions of the base minutia of the latent and tenprint pair and a connecting line to the candidate minutia of FIGS. 4a and 4b $$\alpha = \theta + \theta' \qquad 2$$

From logic block 522, the logic flows to a further block 524. Block 524 represents calculation of $\sigma$, the standard deviation of $\alpha$ $$\sqrt{\sigma} = \omega\sqrt{(1/r^2 + 1/r'^2)} \qquad 3$$

From block 524 of FIG. 5a, the logic flows to a block 526, which represents the setting of $\zeta$ to $-\sigma$ a second time.

Decision block 528 compares the absolute value of the difference between $\alpha$ and $\zeta$ with a value of 3*$\sigma$, and routes the logic flow by way of the NO output of decision block 528 to decision block 532 if $$|\alpha - \zeta| \prec 3\sigma \qquad 4$$

and otherwise routes the logic by the YES output to block 530. Block 530 represents the setting or incrementing of the accumulation matrix P($\zeta$) to $$P(\xi) = P(\xi) - 1/2\left(\frac{\alpha - \xi}{\sigma}\right)^2 \qquad 5$$

The logic arrives at decision block 532 of FIG. 5a from decision block 528, either directly by way of path 531, or by way of block 530. Decision block 532 compares $\zeta$ with $\pi$, and routes the logic to its YES output if $\zeta > \pi$, and otherwise routes the logic to its NO output. If $\zeta$ is less than $\pi$, the NO output of block 532 routes the logic to a further block 534, which increments the current value of $\zeta$ by 1°. From block 534, the logic loops back to decision block 528. The logic will continue to loop around blocks 528, 530, 532, and 534 until such time as $\zeta$ exceeds $\pi$. Block 528 determines if $\zeta$ is within 3 standard deviations ($\sigma$) of $\alpha$. If the answer is YES then the accumulator matrix P($\zeta$) is modified by block 530. Thus the accumulator matrix is robust with respect to outlier observations. Eventually, the value of $\zeta$ will exceed $\pi$, and decision block 532 routes the logic by way of its YES output path to a further decision block 534. Decision block 534 examines the first supporting set to see if there are any more candidates to be evaluated. If there are more candidate pairs to be evaluated, the logic leaves decision block 534 by the YES output, and returns to block 520 by way of logic node E. The logic then loops repeatedly about blocks 520, 522, 524, 526, 528, either block 530 or path 531, block 532 and, as appropriate, block 534 until, eventually, all the candidate pairs in the first supporting set will have been evaluated, and the logic will then leave decision block 534 by the NO output, and proceeds by way of logic node F to block 536 of FIG. 5b.

Blocks 510 to 534 represent the formulation of the Baysian probability function P($\zeta$). Blocks 536 to 550 determines the peak of P($\zeta$) and candidates that are inconsistent with this peak are rejected (528–534). The formulation of P($\zeta$) is robust with respect to outliers due to Blocks 528–530.

Block 536 of FIG. 5b represents the setting of the angular bias value to 0°. The logic flows from block 536 to a block 538, which represents the setting of a variable max_val to the value P(0) of the accumulator matrix for a value of zero bias or $\zeta=0$. The bias angle calculated in Blocks 540–552 represents the best bias angle for the base pair given the first set of candidate minutia.

Logic block 540 represents the setting of the value of $\zeta$ to $-\pi$. From block 540, the logic flows to a decision block 542, which compares P($\zeta$) with variable max_val, and which routes the logic by way of its NO output and a path 543 to a further decision block 548 if P($\zeta$) is less than or equal to variable max_val. If P($\zeta$)>max_val, decision block 542 routes the logic by way of its YES output to decision block 548 by way of blocks 544 and 546. Block 544 represents the setting of the value of the angular bias to $\zeta$, and block 546 represents the setting of variable max_val to the current value of P($\zeta$). By either path, the logic arrives at decision block 548, which compares $\zeta$ with $\pi$, and which routes the logic by way of its NO output to a block 550 if ζ is less than or equal to π. Block 550 increments the current value of ζ to (ζ+1°), and returns the logic flow to decision block 542. The logic loops about logic blocks 542 and 548, and blocks 544, 546, and 550 as appropriate, and eventually arrives again at decision block 548 under the condition that (ζ>π), in which case decision block 548 routes the logic to a further block 552.

Block 552 of FIG. 5b represents the choosing of a candidate pair of minutia from the first set of supporting minutia. Block 554 represents computation of α=θ−θ'. Block 556 represents computation of the standard deviation σ or, in the alternative, of fetching the previously calculated value of σ from storage. From block 558, the logic flows to a decision block 558, which compares the absolute value of (α-bias) with the three-σ value $$|\alpha-\text{bias}|<3\sigma \qquad 6$$

and routes the logic to a further block 560 if the condition of equation (6) is satisfied, and to decision block 562 by way of a path 559 if the condition is not satisfied. Block 560 represents the addition of the candidate minutia pair to the second set of supporting minutia pairs. By either path, the logic arrives at decision block 562. Decision block 562 examines the first supporting set to see if there are any which have not yet been evaluated. If so, the logic leaves decision block 562 by the YES output, and proceeds over a logic path 563 back to logic block 552. The logic flows around the loop including blocks 552, 554, 556, 558, either path 559 or block 560 as appropriate, block 562, and path 563 as many times as may be required to evaluate all the candidate pairs in the first supporting set. Eventually, all the candidate minutia pairs of the first supporting set will have been evaluated, and the logic leaves decision block 562 by the NO output, and returns to block 222 of FIG. 2 or to block 610 of FIG. 6a.

Figure 6A:
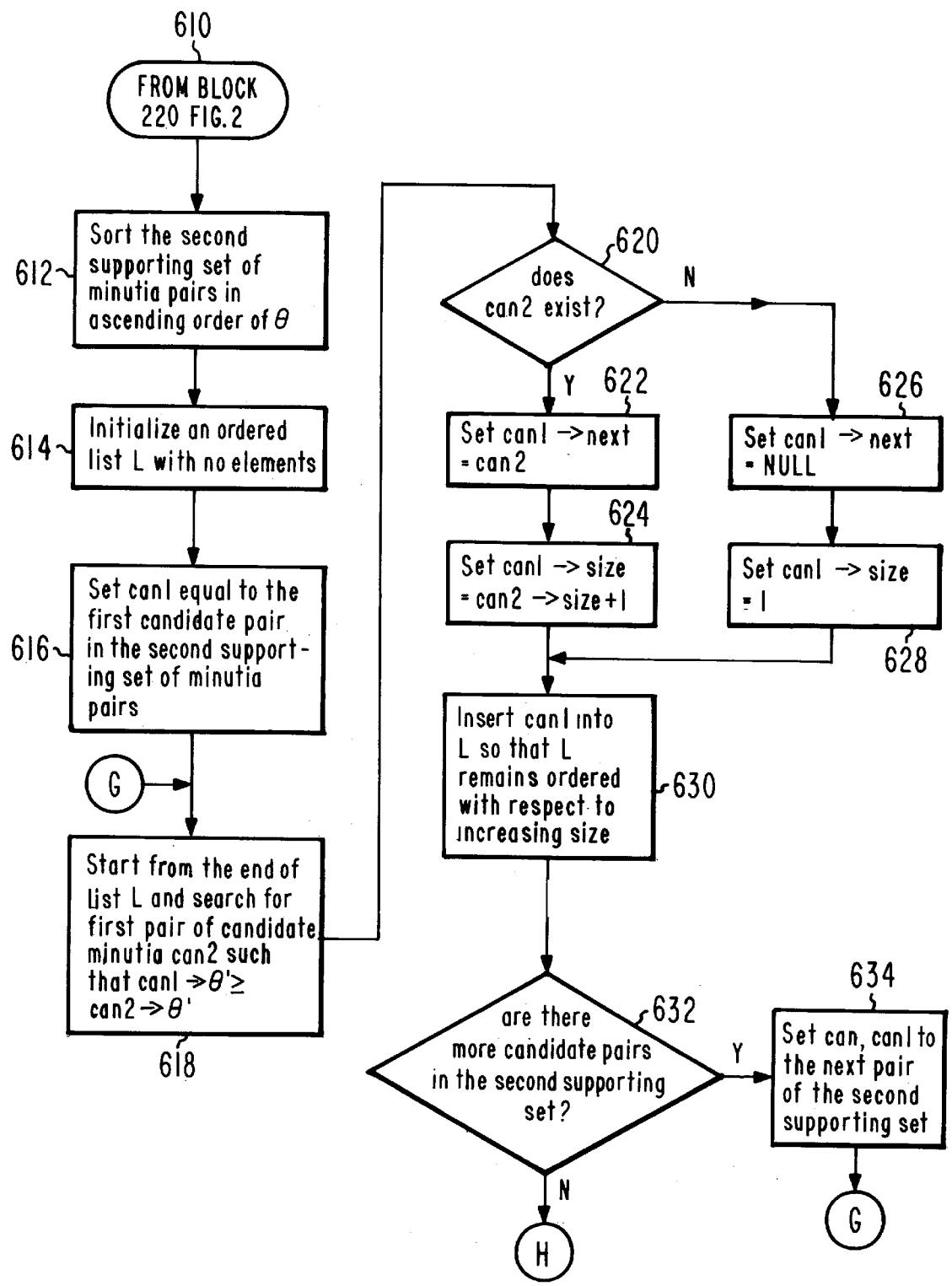
FIGS. 6a and 6b taken together are a flow chart illustrating another portion of the processing of FIG. 2.
Figure 6B:
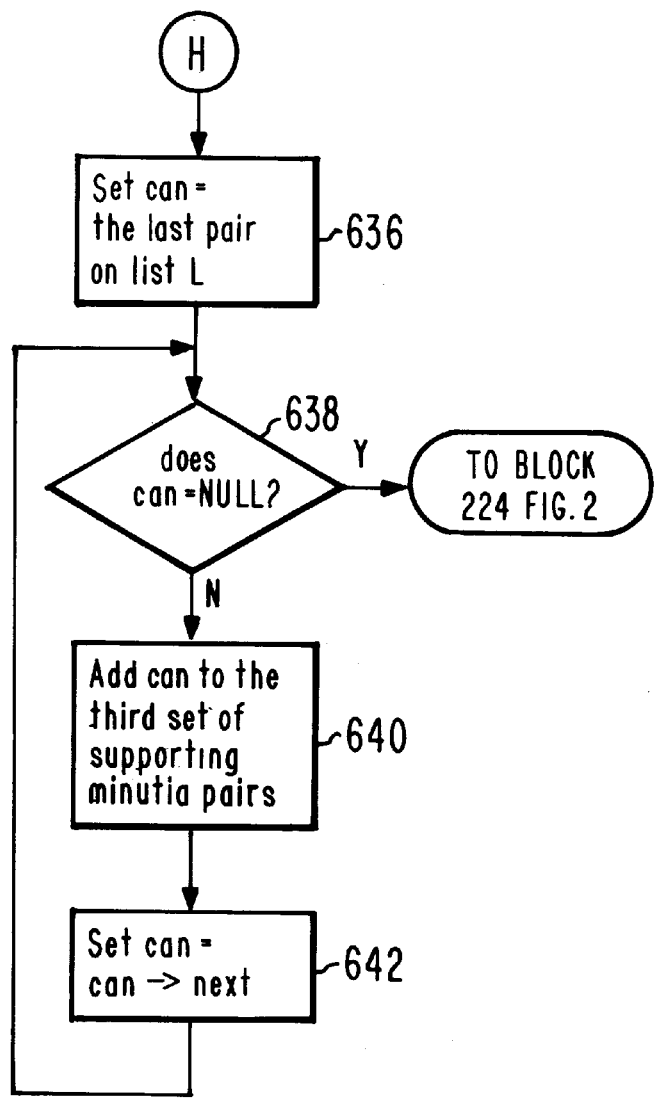

The flow chart of FIGS. 6a and 6b represents the logic of block 222 of FIG. 2.

Figure 7:
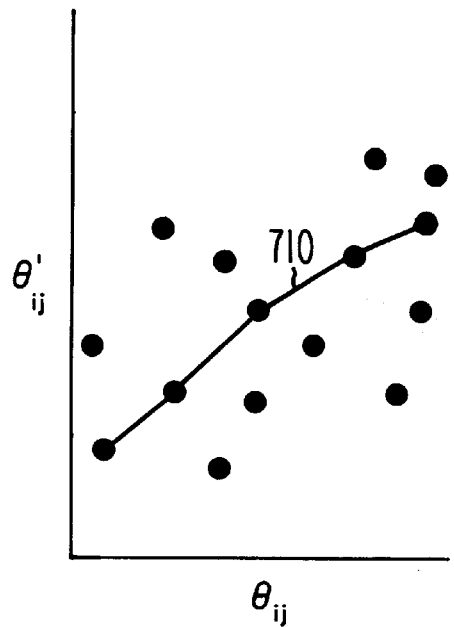
FIG. 7 is a graph illustrating points corresponding to minutia pairs, and a monotonically increasing line connecting certain points.

The intent of this part of the processing can be explained by reference to FIG. 7. FIG. 7 is a plot of the angles of the candidate pairs of the second supporting list, plotted with θ along the horizontal axis, and with θ' along the vertical axis. The goal of the processing of FIGS. 6a and 6b is to identify that one monotonically increasing path, such as line 710 of FIG. 7, which intersects the largest number of dots of FIG. 7, corresponding to candidate pairs. This "best" path represents the third set of minutia pairs which supports the hypothesis that the particular base pair is a correct match. In FIG. 6a, the logic arrives from block 220 of FIG. 2 (from block 562 of FIG. 5b) and arrives at a block 612, which represents the sorting of the second supporting set of minutia pairs in ascending order of θ. From block 612, the logic flows to a block 614, which represents the initialization of an ordered list L (not illustrated) of minutia pairs to contain zero elements. Ordered list L will eventually contain a number of candidates, in the order can1, can2, can3 . . . , in which each candidate includes a SIZE attribute representative of the size of the number of candidates on the best path leading to this particular candidate, and also contains pointer, which points to the previous candidate on said best path, all as described below. From block 614, the logic flows to a block 616, which represents searching list L, from the end of the list, for the first pair of candidate minutia, designated can2, that satisfies $$\theta'_{can1} \geq \theta'_{can2} \qquad 7$$

During the first iteration, the beginning and end of the list are the same, so the calculation starts at the beginning of the list.

From block 618, the logic flows to a decision block 620, which examines list L to determine if can2 exists and fulfills the requirement of equation 7. If can2 exists in list L, and it meets the condition of equation 7, the logic leaves decision block 620 by the YES output path, and proceeds to a block 622. Block 622 represents the setting of the pointer of can1 to point to can2. Block 624 represents the setting of the SIZE parameter or attribute of can1, which represents the size of can2 plus 1, so that can1 always knows how large a chain of compatible candidates lie in the best chain of candidate pairs, and also knows where it links into the chain (can1 always points to can2, can2 points to can3, etc.). From block 624, the logic of FIG. 6a flows to a further block 630. If can2 does not exist in list L, or if it does not fulfill the criterion of equation 7, decision block 620 directs the logic to a block 626, which represents the setting of the can1 pointer to NULL, meaning that the chain of candidate pairs ends. From block 626, the logic flows to a block 628, which represents the setting of the size of can1 to 1, meaning that the chain of candidate pairs has a length of one. From block 628, the logic flows to block 630.

The logic of FIG. 6a arrives at block 630 either from block 624 or block 28. Block 630 represents the insertion of can1 into list L in such a fashion that L remains ordered with respect to size. From block 630, the logic flows to a decision block 632, which examines the second supporting set of candidate minutia pairs to see if any remain to be evaluated. If some remain, the logic leaves decision block 632 by the YES output or path, and arrives at a block 634. Block 634 represents the setting of can1 to the next pair of the second supporting set which are to be evaluated, and directs the logic by way of a logic node G back to logic block 618 of FIG. 6a. The logic circulates around the loop including block 618, 620, paths 622, 624 or 626, 628 as appropriate, through block 630, and to decision block 632 as many times as may be necessary to evaluate all of the candidate pairs in the second supporting set of candidate minutia. When all the candidate pairs of the second supporting set have been evaluated, the logic leaves decision block 632 by the NO path, and flows by way of a logic node H to a block 636 of FIG. 6b.

The processing of FIG. 6b retraces the longest chain of cascaded candidate pairs which are topologically consistent, back to the bottom of list L. At the bottom of list L, the size of the candidate pair has the maximum value, and at the top of the list, the size of the candidate pair has a value of NULL. Block. 636 of FIG. 6b represents the setting of a variable "can" to equal the last or bottom candidate pair on list L, which should be the candidate pair with the largest size or chain. From block 636, the logic flows to a decision block 638, in which the value of variable can is evaluated to see if the value of the size of the candidate pair is NULL, meaning that the task has been completed. If the value is NULL, the set of remaining candidates is empty, and the logic flows by the YES output of decision block 638 to block 224 of FIG. 2, in which another tenprint minutia is selected for evaluation. If the value of variable can is not NULL, the logic flow of FIG. 6b proceeds by way of the NO output of decision block 638 to a block 640. Block 640 represents addition of the current value of variable can to the third set of supporting minutia pairs which supports the hypothesis, contention or postulate that the current base minutia pair is a correct match. From block 640, the logic flows to a further block 642, in which variable can is set equal to the next candidate to which the current candidate points to the next $$\text{can}=\text{can} \rightarrow \text{next} \qquad 8$$

From block 642, the logic loops back to decision block 638. The logic flows around the logic loop including b locks 638, 640, and 642, adding the candidate pairs of the longest chain to the third set of supporting minutia pairs. Eventually, the logic evaluates and places the NULL minutia pair, and flows by way of the YES output of decision block 638 to block 224 of FIG. 2.

Figure 8:
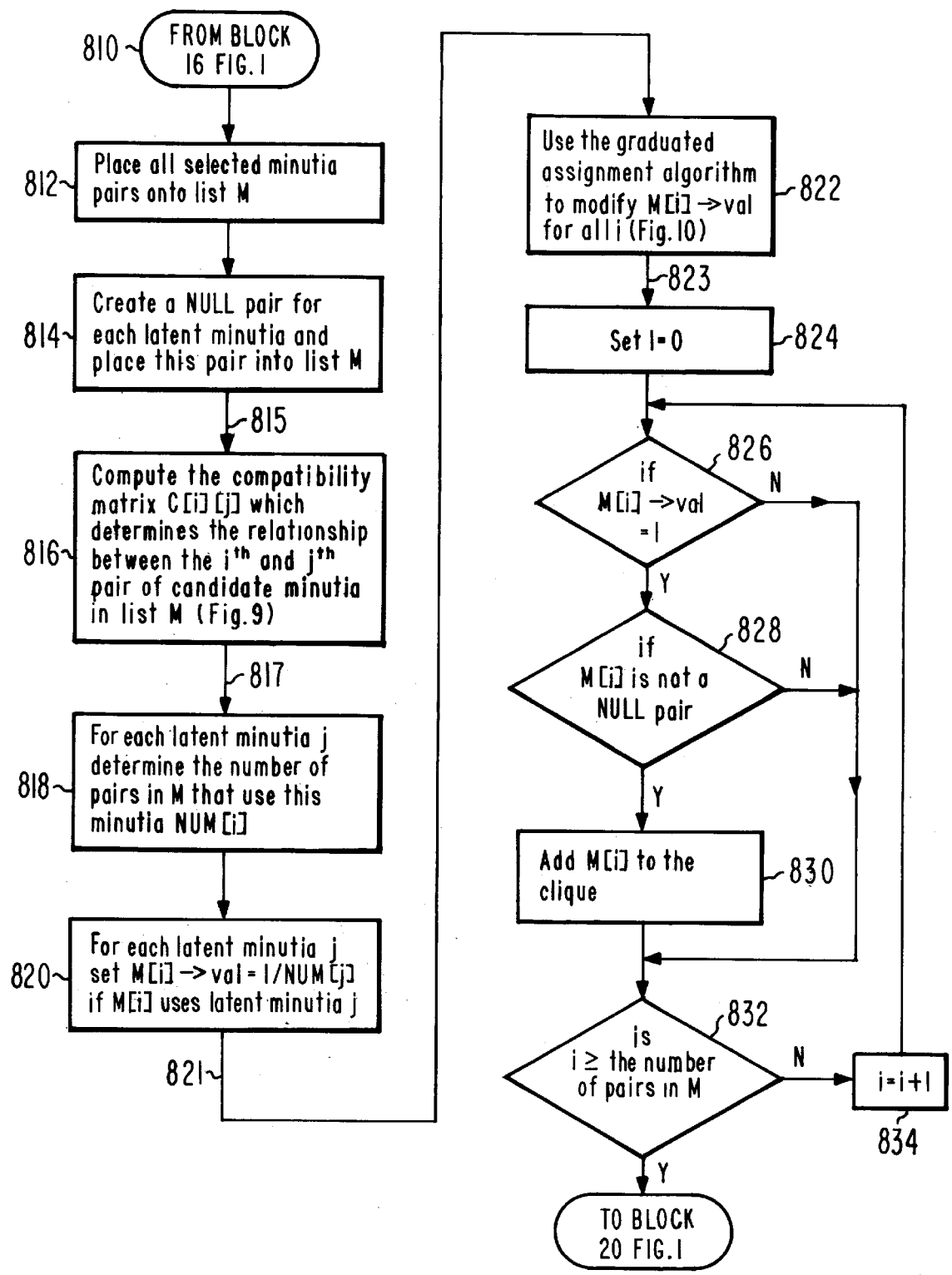
FIG. 8 is a simplified flow chart illustrating a portion of the processing of the method of FIG. 1.

The logic flows from block 16 of FIG. 1, by way of a block 810 of FIG. 8, to a further block 812. Block 812 represents the placement, in a list M, of all of the minutia pairs selected in block 228 of FIG. 2. Block 814 creates a NULL pair for each latent minutia, and places the pair in list M. From block 814, the logic flows to a block 816. Block 816 represents the computation of a computability matrix $C_{ij}$, which determines the relationship between the $i^{th}$ and $j^{th}$ pair of candidate minutia in list M, as described in more detail in relation to FIG. 9. From block 816, the logic flows to a block 818, which represents determination, for each latent fingerprint minutia j, the number of pairs $NUM_j$ in list M which use minutia number j. Block 820 represents, for each latent fingerprint minutia j, setting the value of $M_i$ to $1/NUM_j$ if the pair $M_i$ uses latent minutia j.

From block 820 of FIG. 8, the logic flows to a block 822, which represents application of the Graduated Assignment algorithm, as described in a paper entitled *A Graduated Assignment Algorithm for Graph Matching*, by Samuel Gold and Anand Rangarajan, published at pp 377–388 of the IEEE Transactions on Pattern Analysis and Machine Intelligence, Vol 18, No. 4, April, 1996, to modify the value of $M_i$ for all j, as detailed below in relation to FIG. 10. From block 822 of FIG. 8, the logic flows by way of a logic path 823 to a block 824, in which the value of index i is set to zero, in preparation for entering a following logic loop which determines which pairs enter the clique and which do not.

From block 824 of FIG. 8, the logic flows to a decision block 826, in which the value of $M_i$, designated $M_i \rightarrow val$, is compared with the value 1 or unity, and the logic leaves decision block 826 by the YES path if the value is unity, for further evaluation to be a member of the clique. If the value of $M_i$ is other than unity, the minutia pair is not a member of the clique, and the logic leaves decision block 826 by the NO path, and flows directly to a decision block 832. From the YES output of decision block 826, the logic flows to a further decision block 828, in which $M_i$ is compared with a null pair (meaning that the latent minutia does not map to any tenprint minutia). If $M_i$ is a nullity, it cannot be a member of the clique, and the logic leaves decision block 828 by the NO output, and flows to decision block 832. If the value of $M_i$ is other than NULL, the logic leaves decision block 828 by the YES output, and arrives at a block 830, which represents the addition of $M_i$ to the clique. From block 830, or from blocks 826 or 828, the logic arrives at decision block 832, which represents comparing index i with the number of pairs in list M, to determine if this stage of computation is finished. If more elements of list M remain to be evaluated, the logic leaves decision block 832 by the NO output, the index i is incremented in a block 834, and the logic flows back to decision block 826. The logic flows around the loop including blocks 826, 828, and 830, as appropriate, and through blocks 832 and 834, until all the minutia pairs in list M have been evaluated for inclusion in the clique. When all the minutia pairs in list M have been evaluated, the logic leaves decision block 832 by way of the YES output, and flows to block 20 of FIG. 1.

Figure 9:
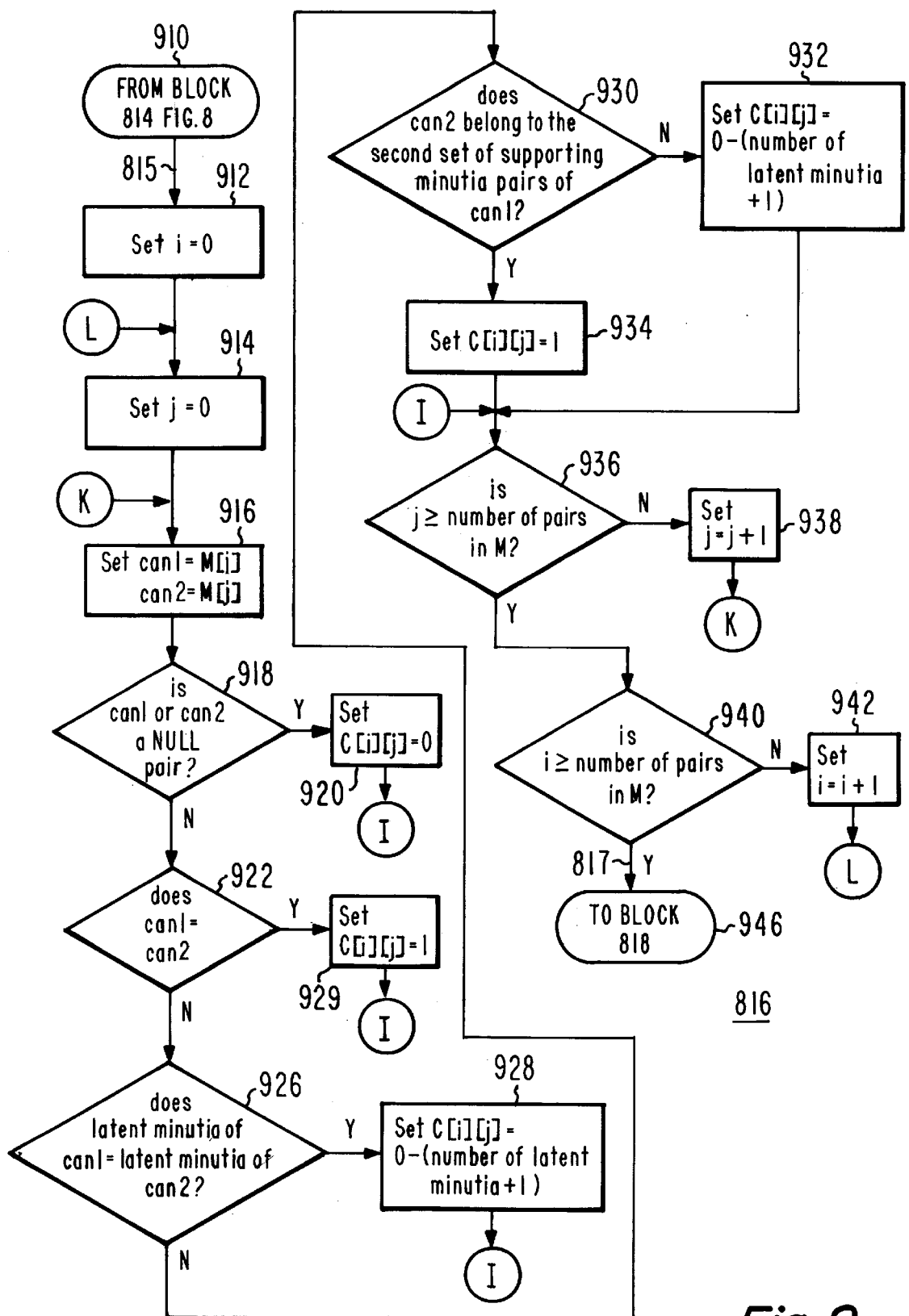
FIG. 9 is a simplified flow chart illustrating a portion of the processing of FIG. 8.

FIG. 9 is a more detailed flow chart illustrating the operation of block 816 of FIG. 8. In FIG. 9, the logic flow arrives from block 814 of FIG. 8, and proceeds to a block 912, which represents the setting or initializing to 0 of a new index i.

It should be noted that sequential processing is assumed, in which the logic flows through all of the flow charts in sequence, so that an index may be reset upon entering each new computation: thus, if simultaneous processing of portions of the overall flow chart of FIG. 1 is desired, some of the indices must be renamed. This is but a simple matter for those skilled in the art. From block 912 of FIG. 9, the logic flows to a block 914, which sets a new index j to 0. Block 916 represents the setting of a new variable "can1" to equal $M_i$, and "can2" to equal $M_j$. From block 916, the logic flows to a decision block 918, in which can1 and can2 are examined to see if either represents the mapping of minutia of the latent fingerprint to no tenprint minutia. If this condition exists for either can1 or can2, the logic flows by the YES output of decision block 918 to a block 920. Block 920 represents the setting of a compatibility matrix $C_{ij}$ to zero. This setting means that there is no interaction between the candidate minutia.

On the other hand, if neither can1 nor can2 is a NULL pair, the logic leaves decision block 918 OF FIG. 9 by the NO output, and arrives at another decision block 922. Decision block 922 compares can1 with can2, and if they are equal, the candidate minutia are compatible, the logic leaves decision block 922 by the YES output, to arrive at a block 924, in which $C_{ij}$ is set equal to one or unity. If can1 and can2 are not equal, they may or may not be compatible, and the logic leaves decision block 922 by the NO output, and flows to a further decision block 926. If can1 and can2 are not equal, then either the latent or tenprint minutia are not equal, or both. Block 926 examines can1 and can2 to determine if the latent minutia of can1 equals the latent minutia of can2. If they have the same latent minutia, then the tenprint minutia must differ, which is an incompatible situation, and the logic leaves decision block 926 by the YES output, and arrives at a block 928. Block 928 represents the setting of $$C_{ij}=(0-[Z+1])$$

where Z is the number of latent minutia in the latent fingerprint.

The logic flows from block 928 to a decision block 936 by way of a logic node I. On the other hand, if the latent minutia of can1 and can2 are dissimilar, then the pairs may or may not be compatible, and the logic leaves decision block 926 by the NO output, and flows to decision block 930.

Decision block 930 of FIG. 9 examines can1 and can2 to determine if the minutia of can2 are in, or belong to, the second set of supporting minutia pairs of can1.

If not, the logic exits decision block 930 by the NO output, and flows to a block 932. Block 932 represents the setting of $$C_{ij}=(0-[Z+1])$$

and the logic flows to decision block 936. If decision block 930 finds that the minutia of can2 are in the second set of supporting minutia pairs of can1, the logic leaves decision block 930 by the YES output, and flows to block 940. Block 940 represents the setting of $C_{ij}=1$. From block 934, the logic flows to decision block 936.

The logic arrives at decision block 936 of FIG. 9 from node I, from block 932, or from block 934. Decision block 936 examines the index j of can2 to determine if j is greater than or equal to the number of minutia pairs in list M, thereby indicating that all minutia pairs in list M have been evaluated. If not, the logic leaves decision block 936 by the NO output, and arrives at a block 938, which represents incrementing index j, j=(j+1).

The logic then leaves block 938 and returns by way of a logic node K to block 916, to again flow through the logic represented by blocks 916, 918, 920, 922, 924, 926, 928, 930, 932, 934, and 936, or the relevant portions thereof.

Eventually, all of the minutia in list M will have been evaluated, and decision block 936 will in that case route the logic by way of its YES output to a further decision block 940. Decision block 940 represents evaluation of index i, to determine if all of the i-indexed pairs in list M have been evaluated. If not, the logic leaves decision block 940 by the NO output, and arrives at a block 942, which represents incrementing of index i, i=(i+1). The logic flows from block 942 by way of a logic node L back to block 914, to begin evaluation of all minutia pairs in m with the incremented value of the index. The logic then flows through blocks 914, 916, 918, 920, 922, 924, 926, 928, 930, 932, 934, and 936, or the relevant portions thereof, as many times as may be required to evaluate for all subscripts i. Under the condition that all i have been evaluated, the logic leaves decision block 940 by the YES output, and flows by way of a logic path 817 to block 818 of FIG. 8.

Figure 10:
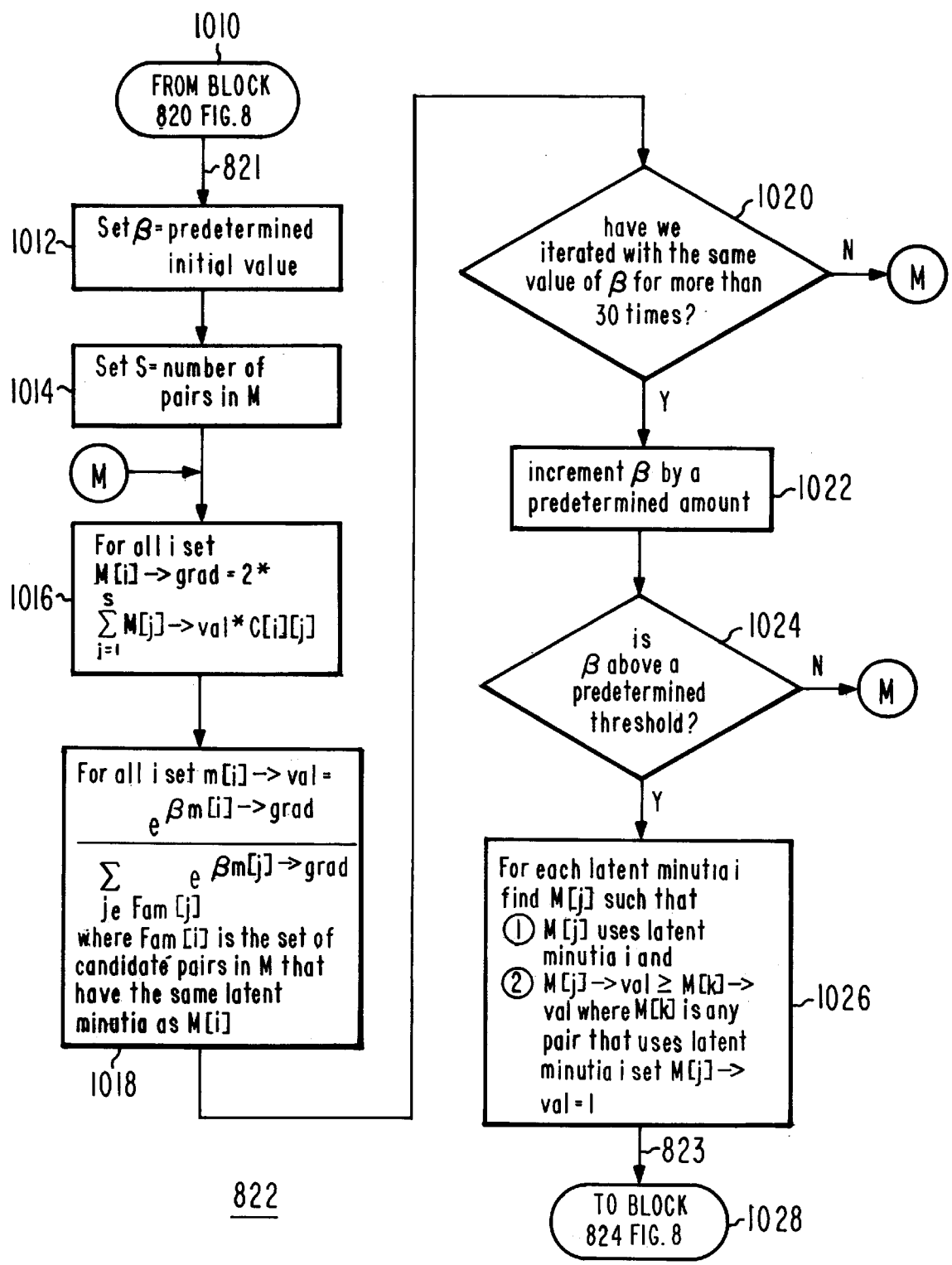
FIG. 10 is a simplified flow chart illustrating another portion of the processing of FIG. 8.

FIG. 10 is a simplified flow chart detailing the logic of block 822 of FIG. 8. In FIG. 10, the logic arrives by way of a logic path 821 at a block 1012, which represents the setting of a variable $\beta$ to a predetermined initial value. The initial value is set low, i.e. 0.5. From block 1012, the logic flows to a block 1014, which represents the setting of constant s to equal the number of pairs in list M. From block 1014, the logic flows to a block 1016, which represents the setting, for all i, of $$M_i \to \_ = 2 * \sum_{j=1}^{S} m_j \to val * C_{ij} \qquad 9$$

where grad or $m_i \to \nabla$ is equal to the change in $$\sum_{j=1}^{S} m_j \to val \qquad 10$$

that will happen if ($m_i \to$ value) is changed, and $m_i \to$ val is the current weight or confidence given to pair $m_i$.

From block 1016, the logic flows to a block 1018, which represents the setting, for all i, of $$M_i \to val = \frac{e^{B M_i \to \Delta}}{\sum_{j \in FA_{M_i}} e^{B M_i \to \Delta}} \qquad 11$$

where Fam[i] is the set of candidate pairs in M that have the same latent minutia as pair M[i];

From block 1018, the logic flows to a decision block 1020, in which the number of iterations with the same value of $\beta$ is limited, by comparing the number of iterations with a predetermined number, in this case the number thirty, and if the limit number of iterations has not been reached, the logic leaves decision block 1020 by the NO output, and returns by way of a logic node M to block 1016. If the limit number of iterations has been reached, the logic leaves decision block 1020 by way of the YES output, and arrives at a block 1022, which represents the incrementing of $\beta$ by a predetermined amount. The logic then arrives at a decision block 1024, which compares $\beta$ with a predetermined threshold. If $\beta$ is not above the predetermined threshold, the logic leaves decision block 1024 by the NO output, and returns, by way of logic node M, to block 1016.

Eventually, the logic will arrive again at decision block 1024 at a time when $\beta$ is above the threshold, and the logic then flows to a block 1026. Block 1026 represents the finding, for each latent minutia, $M_j$ such that two conditions are satisfied, (a) $M_j$ uses latent minutia i, and (b) the value of $M_j$ is greater than, or equal to, the value of $M_k$, where $M_k$ is any minutia pair that uses latent minutia i. It must be understood that, for each minutia i in the latent print, there are N minutia in list M which use the particular minutia i. Block 1026 determines the pair which has the largest value. All other pairs have their value set to zero, while the pair with the largest value has its value set to unity or 1.

This procedure is performed for all latent minutia in the latent print. From block 1026, the logic flows by way of logic path 823 to the next block, namely block 824 of FIG. 8.

Thus, a method for matching an unknown fingerprint, or a fingerprint to be identified, with a database of known fingerprints, includes the step (24) of selecting a tenprint or reference fingerprint for comparison with a latent fingerprint (14) under consideration. A base pair of minutia is selected (212, 214) in each of the latent and tenprint fingerprints. For the selected base pair, those sets of minutia pairs are selected (216) which satisfy a priori constraints including angle distance and ridge counts, to thereby generate a first set of supporting minutia pairs, which support the supposition that the latent fingerprint corresponds to the tenprint fingerprint. The first supporting set, then, includes those pairs of minutia which are consistent with the base pair with respect to a priori information such as orientation, location, and ridge count. A bias angle ($\theta$, $\Phi$) is determined (218) between the minutia of the base pair based on the angles of the minutia of the sets of minutia pairs relative to the base pair. A second set of the supporting minutia pairs is generated from the first (220) using the bias angle. The second supporting set includes those pairs of minutia which are consistent with the bias angle using a Baysian probability measure. The second set does not contain those pairs of the supporting minutia pairs which are inconsistent with the base pair considered with the bias angle. A third set is established (222) by determining the largest subset of the second set which is topologically self-consistent. The third supporting set is the largest subset of the second supporting set which is topologically self-consistent, as determined using dynamic programming. The number of minutia pairings are counted in the third set, to thereby establish a merit of the base pair. A new base pair, not already selected, is selected (212, 214), and for the new base pair, the steps of generating a first set, determining a bias angle, generating a second set, establishing a third set, and counting the number of minutia pairings are repeated (224, 226), to thereby establish a merit for the new base pair. A table of merits is formed for all possible base pairs, by repeating the step of selecting a new base pair for all possible base pair combinations of the latent and tenprint fingerprints. For each of the minutia of the latent fingerprint, a correspondence group is generated (228), of a predetermined number of minutia of the tenprint which have the greatest merit. The correspondence group is searched (18, 810–834) for a maximal clique in which every latent-tenprint minutia pair is consistent with every other latent-tenprint minutia pair in the clique. The cardinality of the maximal clique is temporarily stored 18. The cardinality is equal to the number of latent-tenprint minutia pairs in the maximal clique. The steps of selecting a tenprint fingerprint for comparison (24), selecting a base pair of minutia (212, 214), selecting those sets of minutia pairs which satisfy a priori constraints (216), determining a bias angle (218), generating a second set (220), establishing a third set (222); counting the number of minutia pairings in the third subset (222), selecting a new base pair (212–214), forming a table of merits (222); generating a correspondence group (228), searching the correspondence group (18), and temporarily storing the cardinality (18), are repeated for all relevant tenprints in the database, to thereby generate a set of cardinalities. From the set of cardinalities, at least that one member of the set is selected (26) which has the greatest value, as representing that one of the tenprints most closely matching the latent fingerprint.

In a particular method according to the invention, the step of determining a bias angle (218) includes the step of maximizing a Baysian probability measure. The step of maximizing a Baysian probability measure may include the step of rejecting outlier data (528-530), and determining (216) the number of candidate minutia pairs which are consistent with the base pair of minutia based on the a priori data.

In a method according to the invention, the step of determining the largest subset (222) of the second set which is topologically self-consistent, to thereby establish a third set, is performed by dynamic programming.

Other embodiments of the invention will be apparent to those skilled in the art. For example, the development of the cost function Cij so that the graduated assignment algorithm must converge to a maximal clique. Note in its original form the graduated assignment algorithm is used to search for maxima of general quadratic binary functions; however, our particular choice of Cij results in a maximal clique solution.

What is claimed is:

1. A method for matching an unknown fingerprint with a database of known fingerprints, said method comprising the steps of:

selecting a tenprint fingerprint for comparison with a latent fingerprint under consideration;

selecting a base pair of minutia in each of said latent and tenprint fingerprints;

for said base pair, selecting those sets of minutia pairs which satisfy a priori constraints including angle distance and ridge counts, to thereby generate a first set of supporting minutia pairs;

determining a bias angle between said minutia of said minutia of said base pair based on the angles of said minutia of said sets of minutia pairs relative to said base pair;

using said bias angle, generating a first reduced subset of said supporting minutia pairs, which first reduced subset does not contain those pairs of said supporting minutia pairs which are inconsistent with said base pair considered with said bias angle;

establishing a second subset by determining the largest subset of said first reduced subset which is topologically self-consistent;

counting the number of minutia pairings in said second subset to thereby establish a merit of said base pair;

selecting a new base pair not already selected, and for said new base pair, repeating said steps of generating a first set, determining a bias angle, generating a first reduced subset, establishing a second subset, and counting the number of minutia pairings, to thereby establish a merit for said new base pair;

forming a table of merits for all possible base pairs, by repeating said step of selecting a new base pair for all possible base pair combinations of said latent and tenprint fingerprints;

for each of said minutia of said latent fingerprint, generating a correspondence group of a predetermined number of minutia of said tenprint which have the greatest merit;

searching said correspondence group for a maximal clique in which every latent-tenprint minutia pair is consistent with every other latent-tenprint minutia pair in said clique;

temporarily storing the cardinality of said maximal clique, which is equal to the number of latent-tenprint minutia pairs in said maximal clique;

performing said steps of selecting a tenprint fingerprint for comparison, selecting a base pair of minutia, selecting those sets of minutia pairs which satisfy a priori constraints, determining a bias angle, generating a first reduced subset, establishing a second subset; counting the number of minutia pairings in said second subset, selecting a new base pair, forming a table of merits; generating a correspondence group, searching said correspondence group, and temporarily storing the cardinality, for all relevant tenprints in said database, to thereby generate a set of cardinalities; and selecting from said set of cardinalities at least that one member of said set having the greatest value, as representing that one of said tenprints most closely matching said latent fingerprint.

2. A method according to claim 1, wherein said step of determining a bias angle includes the step of maximizing a Baysian probability measure.

3. A method according to claim 2, wherein said step of maximizing a Baysian probability measure includes the step of rejecting outlier data; and counting the number of said sets of a priori candidate minutia for each selected set of candidate and base minutia, determining the number of candidate minutia pairs which are consistent with said base pair of minutia based on said a priori data.

4. A method according to claim 1, wherein said step of determining the largest subset of said first reduced subset which is topologically self-consistent, to thereby establish a second subset, is performed by dynamic programming.

5. A method according to claim 1, wherein said step of searching said correspondence group for a maximal clique includes the step of performing graduated assignment calculations.

* * * * *